(12) United States Patent
Duquesne et al.

(10) Patent No.: US 11,272,668 B2
(45) Date of Patent: Mar. 15, 2022

(54) ADJUSTABLE DUCT FOR A COMBINE HARVESTER CLEANING FAN

(71) Applicant: CNH Industrial America LLC, New Holland, PA (US)

(72) Inventors: Frank R. G. Duquesne, Zwevegem (BE); Jonathan E. Ricketts, Davenport, IA (US); Curtis F. Hillen, Lititz, PA (US); Michiel Vanderstichele, Merkem (BE)

(73) Assignee: CNH Industrial America LLC, New Holland, PA (US)

( * ) Notice: Subject to any disclaimer, the term of this patent is extended or adjusted under 35 U.S.C. 154(b) by 309 days.

(21) Appl. No.: 16/567,358

(22) Filed: Sep. 11, 2019

(65) Prior Publication Data

US 2020/0084971 A1   Mar. 19, 2020

Related U.S. Application Data

(60) Provisional application No. 62/731,402, filed on Sep. 14, 2018.

(51) Int. Cl.
*A01F 12/44* (2006.01)

(52) U.S. Cl.
CPC .......... *A01F 12/444* (2013.01); *A01F 12/446* (2013.01)

(58) Field of Classification Search
CPC ...... A01F 12/444; A01F 12/446; A01F 12/44; A01F 12/30; A01D 75/282; A01D 41/1276
See application file for complete search history.

(56) References Cited

U.S. PATENT DOCUMENTS

| | | | |
|---|---|---|---|
| 66,859 A | 7/1867 | Lockhart | |
| 270,882 A | 1/1883 | Bachman | |
| 875,550 A * | 12/1907 | McCorkell | A01F 12/30 460/85 |
| 1,050,540 A * | 1/1913 | Hohman | F04D 29/462 415/148 |
| 1,884,114 A * | 10/1932 | Moroney | A01F 12/444 460/99 |
| 2,262,453 A | 11/1941 | Dray | |
| 2,324,754 A * | 7/1943 | Barber | A01F 12/444 209/154 |

(Continued)

FOREIGN PATENT DOCUMENTS

| | | | | |
|---|---|---|---|---|
| EP | 0683970 A2 * | 11/1995 | .......... | A01F 12/444 |
| EP | 2740347 A1 | 6/2014 | | |

(Continued)

OTHER PUBLICATIONS

Extended European Search Report for EP Application No. 19197091.2 dated Feb. 5, 2020 (five pages).

*Primary Examiner* — Arpad Fabian-Kovacs
(74) *Attorney, Agent, or Firm* — Peter Zacharias; Patrick Sheldrake

(57) ABSTRACT

A cleaning system for a combine harvester includes a fan, at least one duct having an interior passageway that is positioned to receive an air stream from the fan, and a surface defined within the interior passageway of the at least one duct that is configured to restrict a volume of the flow of air passing through the at least one duct and increase a pressure of the air stream passing through the duct.

18 Claims, 3 Drawing Sheets

(56) References Cited

U.S. PATENT DOCUMENTS

| | | | | |
|---|---|---|---|---|
| 2,682,951 | A * | 7/1954 | Hamburg | A01D 75/282 209/261 |
| 2,849,118 | A * | 8/1958 | Ashton | A01F 12/444 209/318 |
| 3,258,195 | A * | 6/1966 | Laing | F04D 17/04 415/53.3 |
| 3,437,262 | A * | 4/1969 | Eckbruno | F04D 29/283 415/53.1 |
| 3,664,349 | A * | 5/1972 | Quick | A01F 12/444 460/99 |
| 4,017,206 | A * | 4/1977 | Doge | A01F 12/444 415/102 |
| 4,589,425 | A * | 5/1986 | Mitchell, Jr. | A01F 12/444 460/99 |
| 5,376,046 | A * | 12/1994 | Shuknecht | A01D 31/00 171/17 |
| 5,558,576 | A * | 9/1996 | Meyers | A01F 12/444 460/100 |
| 7,416,482 | B2 | 8/2008 | Weichholdt | |
| 8,608,534 | B1 * | 12/2013 | Stahl | A01F 12/444 460/99 |
| 8,821,229 | B2 * | 9/2014 | Stan | A01D 41/1276 460/99 |
| 2006/0287018 | A1 * | 12/2006 | Weichholdt | A01F 12/444 460/99 |
| 2010/0124482 | A1 * | 5/2010 | Ricketts | A01F 12/444 415/53.1 |
| 2013/0167934 | A1 | 7/2013 | Regier | |
| 2017/0094902 | A1 | 4/2017 | Reinecke | |

FOREIGN PATENT DOCUMENTS

| | | | | |
|---|---|---|---|---|
| FR | 730731 | | 8/1932 | |
| GB | 1112548 | A | 5/1968 | |
| GB | 2472639 | A * | 2/2011 | A01F 12/444 |
| WO | WO2014134696 | | 9/2014 | |
| WO | WO2015147083 | | 10/2015 | |

* cited by examiner

150
ADJUSTABLE DUCT FOR A COMBINE HARVESTER CLEANING FAN

FIELD OF THE INVENTION

This invention relates generally to a combine harvester, and more particularly, to an adjustable duct for a cleaning fan of the combine harvester.

BACKGROUND OF THE INVENTION

As described in U.S. Pat. No. 9,462,752, which is incorporated by reference herein in its entirety, FIG. 1 depicts a representative combine harvester 20 constructed and operable according to the present invention. The non-inventive aspects of combine harvester 20 are of conventional, well-known construction and operation. Harvester 20 is representative of a wide variety of combine harvesters for grains such as, but not limited to, wheat and other grasses, corn, and legumes such as soybeans.

Generally, harvester 20 is a self-propelled vehicle having a forward end 24 carrying a crop cutting header 26 operable for severing plants from the ground as harvester 20 is moved in the forward direction, as denoted by arrow F. Header 26 is configured and operable for gathering the cut crops and directing them into a feeder 28. Feeder 28 then conveys the cut crops to a threshing system 30 within a housing 32 of harvester 20.

Harvester 20 includes a cleaning system 38 for carrying material other than grain (MOG) rearwardly from housing 32. The cleaning system 38 includes a cleaning fan 42 disposed forwardly and operable for generating and directing a flow of air upwardly and rearwardly to sieves of the cleaning system 38 for carrying MOG rearwardly from housing 32.

More particularly, air is delivered by fan 42 into a duct 43, and the air in duct 43 is bifurcated into sub-ducts 43a and 43b by a divider 22 that separates the air flow into two separate flows before the air is delivered to sieves of cleaning system 38.

Here, as typical for larger harvesters, cleaning system 38 is depicted as a three sieve sequential arrangement, including an uppermost pre-sieve 44, an upper or chaffer sieve 46, and a lower cleaning sieve 48. Because of the large capacity, length and forward position of threshing system 30, a grain transfer pan 50 is disposed below and generally along the length of the threshing system to receive grain and MOG and convey the same to the uppermost pre-sieve 44.

As mentioned above, air delivered by fan 42 is distributed into multiple sub-ducts 43a and 43b. Each sub-duct 43 and 43b has an outlet configured to direct a volume of air toward one or more of the sieves. Not all crops distributed through the sieves require the same volume of air. For that reason, some known cleaning systems include adjustable deflectors for changing the direction of the air flowing through the ducts, however, the known deflectors do not adequately restrict the amount of air that flows through the ducts.

Testing has showed that forming an hour glass shape in the throat area of one duct greatly affects the volume of air flow through that duct, while maintaining adequate cross-distribution of air flow through the remaining ducts.

SUMMARY OF THE INVENTION

An embodiment includes a cleaning system for a combine harvester comprising a fan, at least one duct having an interior passageway that is positioned to receive an air stream from the fan, and a surface defined within the interior passageway of the at least one duct that is configured to restrict a volume and increase a pressure of the flow of air passing through the at least one duct.

DETAILED DESCRIPTION

Figure 1:
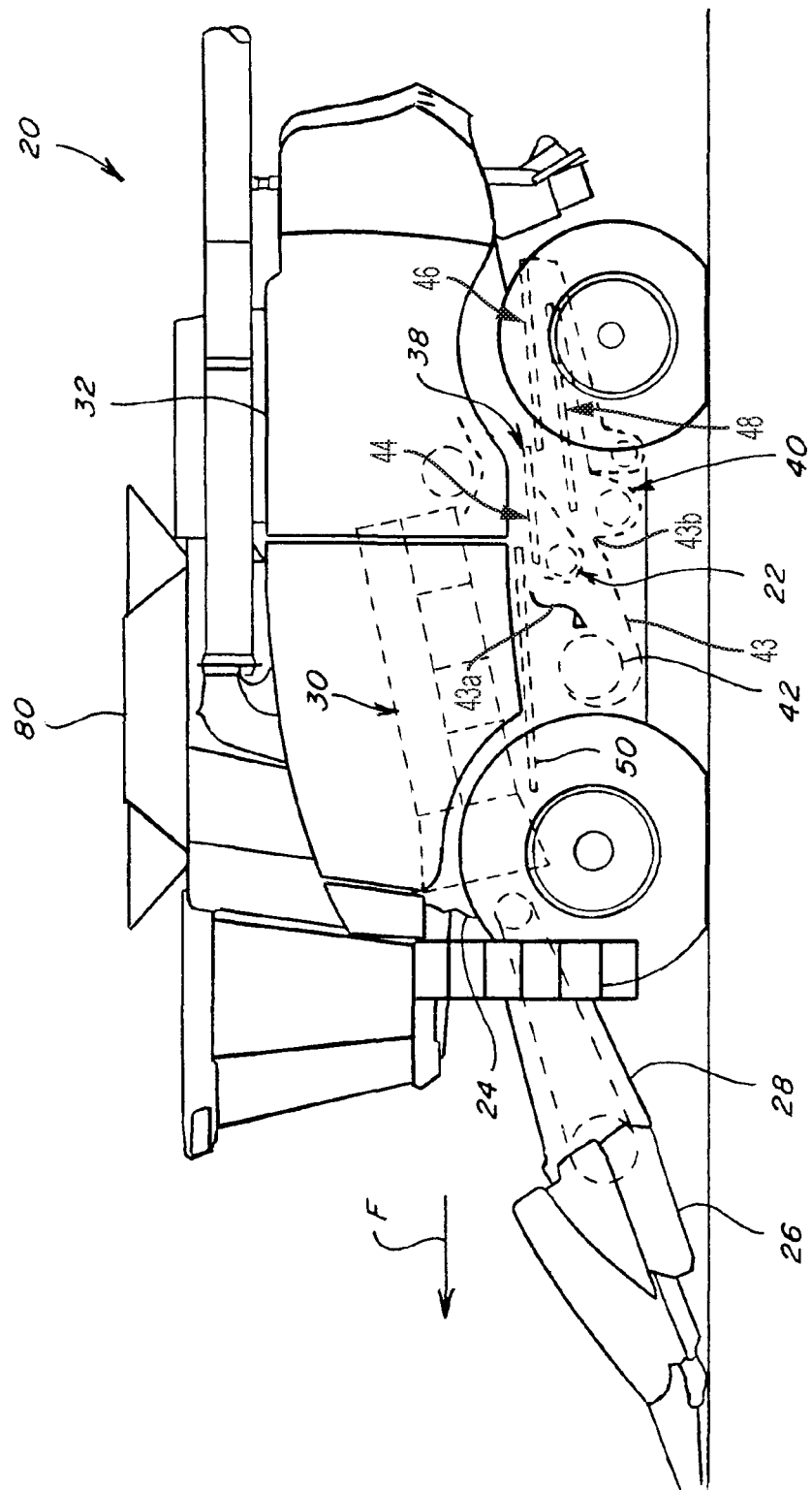
FIG. 1 is a schematic diagram of a representative combine harvester.

The drawing figures depict one or more implementations in accord with the present concepts, by way of example only, not by way of limitations. In the figures, like reference numerals refer to the same or similar elements.

The terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 2:
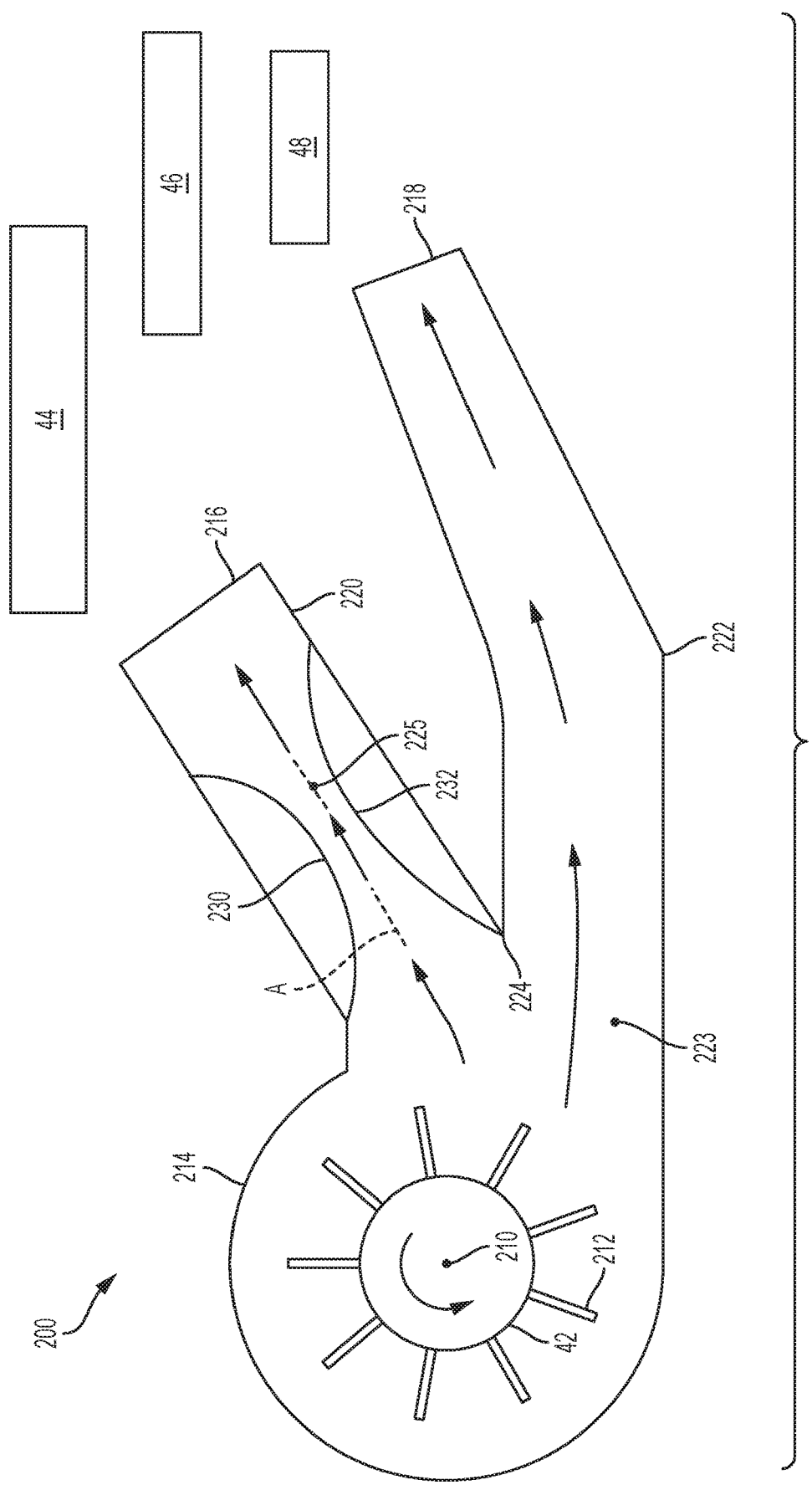
FIG. 2 is a schematic diagram of a cleaning system for the combine harvester of FIG. 1 according to one embodiment.

Referring now to the details of the invention, FIG. 2 is a schematic diagram of a cleaning system 200 (a portion of which is shown) according to one embodiment. The cleaning system 200 generally includes fan 42 that rotates about a shaft 210 and has blades 212 for moving air toward sieves 44, 46 and 48. It should be understood that the number, position and size of the sieves can vary and are not limited to that which is shown and described.

Fan 42 is situated inside of a fan housing 214 having an inlet (not shown) and multiple outlets 216 and 218. The interior region 223 of fan housing 214 bifurcates into the two separate ducts 220 and 222 at point 224. The upper duct 220 forms a passageway between the inlet of fan 42 and outlet 216 to deliver air to sieve 44. The lower duct 222 forms a passageway between the inlet of fan 42 and outlet 218 to deliver air to sieve 48.

The cross-sectional shape of ducts 220 and 222 is either square or rectangular, for example. The interior of upper duct 220 narrows to an hour-glass shape forming a throat 225. The hour-glass shape is constituted by a first curved surface 230 having a convex outer shape that protrudes inwardly toward the longitudinal axis A of the duct 220. The hour-glass shape is also constituted by a second curved surface 232 having a convex outer shape that protrudes inwardly toward the longitudinal axis A of duct 220. Surfaces 230 and 232 are positioned opposite one another to face each other. The curvature of surfaces 230 and 232 may be the same or different (as shown). Throat 225 is defined between surfaces 230 and 232. The surfaces 230 and 232 may be provided in the form of sheets that are mounted to duct 220 by a fastener or a weld, for example. Alternatively, the surfaces 230 and 232 could be integrally formed with duct 220.

The cross-sectional shape of ducts 220 and 222 could also be circular or oval, for example. If the cross-sectional shape of ducts 220 and 222 is circular or oval, for example, then a single hour-glass shaped surface may be disposed within duct 220.

In operation, air produced by fan 42 flows through ducts 220 and 222. Throat 225 formed by surfaces 230 and 232 causes a decrease in the volume of air flowing through duct 220 (as compared to a duct without a throat), and an increase in the volume of air flowing through duct 222. Throat 225 also causes an increase in the air pressure and the air speed through duct 220.

According to the embodiment shown in FIG. 2, the lower duct 222 does not include curved surfaces 230 and 232 forming a throat 225, however, it should be understood that duct 222 could include surfaces 230 and 232 forming a throat 225. According to another embodiment, the lower duct 222 includes surfaces 230 and 232 forming a throat 225.

Surfaces 230 and 232 forming throat 225 are fixed to duct 220 and remain stationary during operation. According to the next embodiments described hereinafter the shape of surfaces may be altered during operation to achieve a desired airflow through cleaning system 200.

Figure 3:
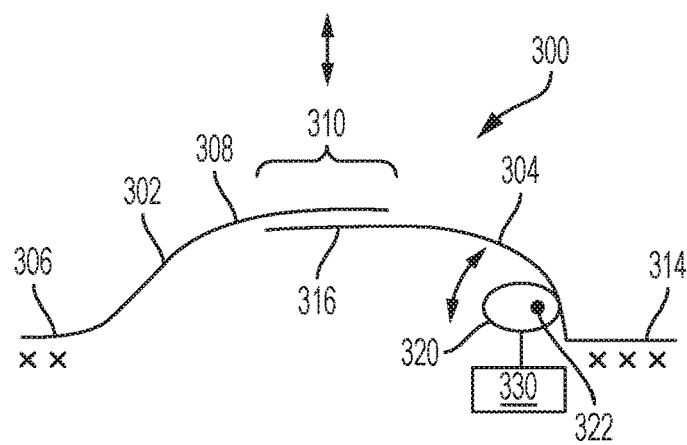
FIG. 3 is a schematic diagram of a movable surface for actively changing the profile of the side wall of a duct of the cleaning system.

FIG. 3 is a schematic diagram of a movable curved surface 300 for actively changing the profile of the side wall of a duct of the cleaning system. Movable surface 300 is intended to replace one or both of stationary surfaces 230 and 232 of the duct 220 of the cleaning system of FIG. 2. The movable surface 300 could also be used in the duct 222.

The movable surface 300 is capable of being moved to adjust the size of the throat 225 in the duct 220, which affects the volume of air flow through the duct 220, as well as the division of air flow between the ducts 220 and 222. More particularly, increasing the size of the throat 225 permits a greater volume of airflow through the duct 220, thereby decreasing the available volume of airflow through the duct 222. Conversely, decreasing the size of the throat 225 results in a lower volume of airflow through the duct 220, thereby increasing the available volume of airflow through the duct 222.

Movable surface 300 generally comprises a resiliently deformable upper wall 302, and resiliently deformable lower wall 304 that is positioned beneath upper wall 302. Walls 302 and 304 are composed of any resiliently deformable material, such as a light gauge steel or spring steel, for example. The upper wall 302 is fixed at one end 306 with respect to the duct. Free end 308 of upper wall 302 at least partially overlaps lower wall 304 by a defined distance 310. Lower wall 304 is fixed at one end 314 with respect to the duct. The free end 316 of lower wall 304 is positioned beneath free end 308 of upper wall 302. A rotatable cam 320 is mounted to a fixed surface (such as duct 220). The exterior surface of cam 320 bears on the interior surface of wall 304. Cam 320 may be adjusted either manually or by a motor (not shown) that is connected to a controller 330.

Rotation of cam 320 about an axis 322 causes wall 304 to move either toward upper wall 302 or away from upper wall 302 (as depicted by the vertical arrows). Specifically, moving lower wall 304 toward upper wall 302 causes upper wall 302 to move outwardly toward the longitudinal axis A of the duct in which movable surface 300 is installed, thereby forming part of an hour-glass shape. Conversely, when cam 320 is rotated such that it does not bias walls 302 and 304 outwardly, the walls 302 and 304 move away from axis A of the duct in which the walls are positioned by virtue of the resilient nature of walls 302 and 304. Upper wall 302 is biased to resist outward movement (as depicted by the vertical arrow in FIG. 3), such that walls 302 and 304 may always be in contact.

Alternatively, cam 320 may be replaced by another device that is capable of moving or deforming lower wall 304, such as a fastener, a bar, a magnet, an electro mechanical linear actuator, a hydraulic actuator, or a pneumatic actuator (such as an air bag). Accordingly, the device for moving or deforming the wall 304 may be referred to more broadly herein as a means for moving. The means for moving may be operated manually, such as by a screw adjustment or manual hand crank, or automatically by a motor connected to controller 330. The controller 330 may receive instructions entered by a user using a display or keyboard in the station/cab of the combine.

Figure 4:
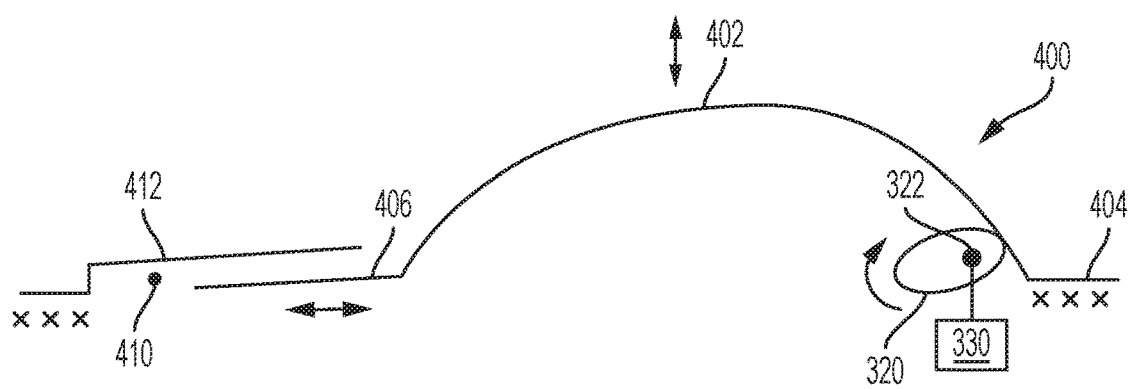
FIG. 4 is a schematic diagram of another movable surface for actively changing the profile of the side wall of a duct of the cleaning system.

FIG. 4 is a schematic diagram of another movable curved surface 400 for actively changing the profile of the side wall of a duct of the cleaning system. Like movable surface 300, movable surface 400 is intended to replace one or both of surfaces 230 and 232 of the cleaning system of FIG. 2. Movable surface 400 is substantially similar to movable surface 300 and the primary differences will be described hereinafter.

Movable surface 400 comprises a resiliently deformable wall 402 that is fixed at end 404 with respect to the duct. Free end 406 of wall 402 is positioned within a slot or channel 410 that is defined by a bracket 412. Ends 404 and 406 are straight whereas the central portion of wall 402 is curved convexly. Unlike wall 402, bracket 412 is not resiliently deformable. Cam 320 (otherwise referred to as a means for moving) causes wall 402 to move either inwardly or outwardly with respect to axis A (as depicted by the vertical arrows). As wall 402 moves, free end 406 of wall 402 slides within channel 410 (as depicted by the horizontal arrows). A motor that drives cam 320 is (optionally) connected to controller 330 such that movement of movable surface 400 can be controlled automatically.

Figure 5:
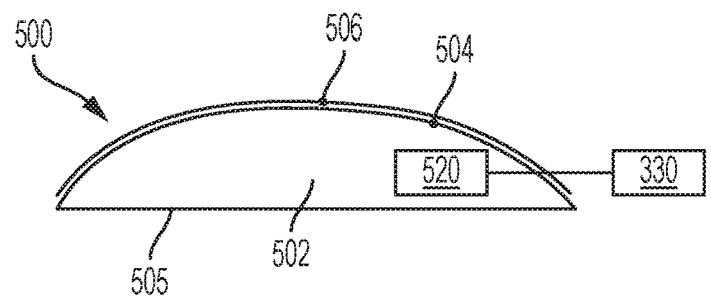
FIG. 5 is a schematic diagram of yet another movable surface for actively changing the profile of the side wall of a duct of the cleaning system.

FIG. 5 is a schematic diagram of another movable surface 500 for actively changing the profile of the side wall of a duct of the cleaning system. Like movable surfaces 300 and 400, movable surface 500 is intended to replace one or both of surfaces 230 and 232 of the cleaning system of FIG. 2. Movable surface 500 is substantially similar to movable surface 300 and the primary differences will be described hereinafter.

Movable surface 500 comprises an inflatable/deflatable member 502 having a convexly curved exterior surface 504. The surface 505 opposite curved exterior surface 504 is mountable to an interior wall of a duct. Although optional, a resiliently deformable sheet 506 may be applied (e.g., adhered or fastened) to the curved exterior surface 504 for enhancing the structural integrity of member 502. A means 520 for inflating inflatable member 502 is connected to inflatable member 502. Means 520 may be a pump, motor, or actuator, for example. Means 520 is (optionally) connected to controller 330 such that inflation or deflation of the inflatable member 502 can be controlled automatically. The interior of the inflatable/deflatable member 502 may be filled with air or filled with a substance, such as oil.

It is to be understood that the above-described operating steps are performed by the controller 330 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 330 described herein, such as the aforementioned method of operation, is implemented in software code or instructions which are tangibly stored on the tangible computer readable medium. Upon loading and executing such software code or instructions by the controller 330, the controller 330 may perform any of the functionality of the controller 330 described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

What is claimed is:

1. A cleaning system for a combine harvester comprising:
    a fan;
    at least one duct having an interior passageway that is positioned to receive an air stream from the fan; and
    a resiliently deformable surface defined within the interior passageway of the at least one duct that is resiliently deformable to a position that restricts a volume and increases a pressure of the flow of air passing through the at least one duct;
    moving means for resiliently deforming the resiliently deformable surface in order to alter the volume of the flow of air passing through the at least one duct,
    wherein the resiliently deformable surface is configured to (i) elastically move from an initial state to a deformed state in response to a pressure applied onto the resiliently deformable surface by the moving means and (ii) elastically return to the initial state in the absence of the pressure.

2. The cleaning system of claim 1, wherein the fan is positioned within a fan housing and the at least one duct either forms part of the fan housing or is fluidly connected to the fan housing.

3. The cleaning system of claim 2, wherein a second duct is fluidly connected to the fan housing for receiving the air stream from the fan.

4. The cleaning system of claim 3 further comprising a second resiliently deformable surface defined within an interior passageway of the second duct that is configured to restrict a volume and increase a pressure of the flow of air passing through the second duct.

5. The cleaning system of claim 1, wherein the resiliently deformable surface has an hour-glass shape as viewed in cross-section.

6. The cleaning system of claim 1, wherein the resiliently deformable surface is positioned on one side of the duct, and a second surface is positioned on an opposite side of the duct facing said surface, wherein a profile of said surface differs from a profile of said second surface.

7. The cleaning system of claim 1, wherein the moving means comprises a rotatable cam positioned adjacent said resiliently deformable surface.

8. The cleaning system of claim 1, wherein the moving means comprises an actuator for moving the resiliently deformable surface.

9. The cleaning system of claim 1, wherein the resiliently deformable surface comprises a balloon, or a balloon is positioned adjacent said resiliently deformable surface, and the moving means comprises a pump for inflating or deflating the balloon.

10. The cleaning system of claim 1 further comprising one or more grain sieves positioned downstream of the at least of duct.

11. The cleaning system of claim 1 further comprising:
    a first grain sieve positioned downstream of the at least one duct;
    a second duct fluidly connected to the fan housing for receiving the air stream from the fan; and
    a second grain sieve positioned downstream of the second duct.

12. The cleaning system of claim 1, wherein the resiliently deformable surface comprises a first wall and a second wall, the first wall being positioned above the second wall in an overlapping fashion.

13. The cleaning system of claim 12 said moving means positioned adjacent the second wall for causing the first and second walls to deform.

14. The cleaning system of claim 13 wherein the first wall is biased to resist movement of the moving means.

15. The cleaning system of claim 12, wherein each wall includes a first end that is fixed and stationary relative to the duct and a second end that is configured to move relative to the duct.

16. The cleaning system of claim 1 wherein the resiliently deformable surface comprises a wall including a first end that is fixed and stationary relative to the duct and a second end that is configured to move relative to the duct.

17. The cleaning system of claim 16 further comprising a bracket that is fixed and stationary relative to the duct and defines a channel in which the second end of the wall is slidably positioned.

18. A combine harvester comprising the cleaning system of claim 1.

* * * * *